Figure 1:
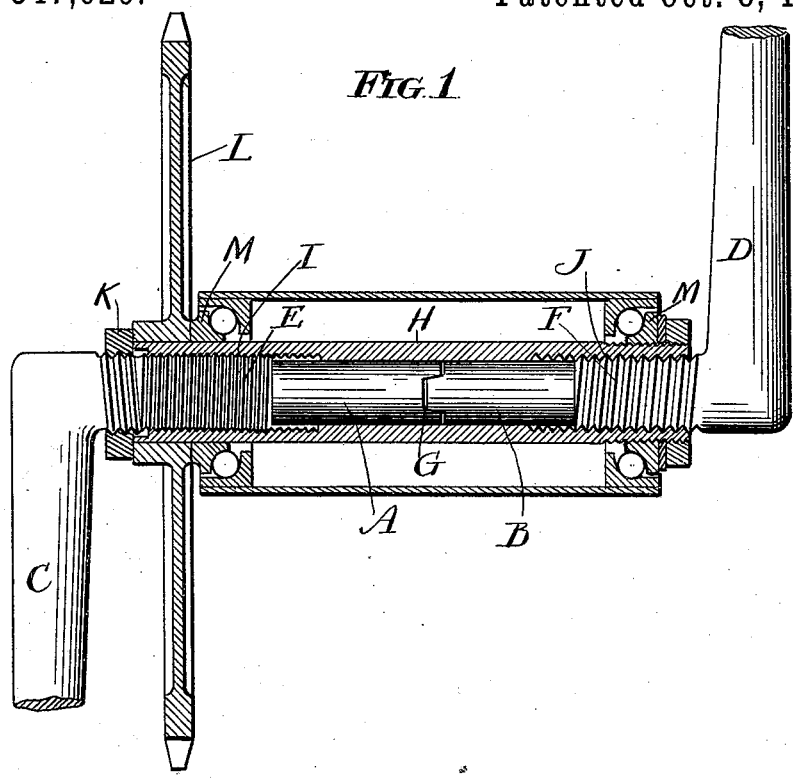

(No Model.)

O. CULLMANN.
JOINT FOR PARTS OF MACHINERY.

No. 547,629.  Patented Oct. 8, 1895.

Witnesses:
J. Halpenny
Geo. F. Bailey

Inventor:
Otto Cullmann
By his attorneys
Gridley & Hopkins

UNITED STATES PATENT OFFICE.

OTTO CULLMANN, OF CHICAGO, ILLINOIS.

JOINT FOR PARTS OF MACHINERY.

SPECIFICATION forming part of Letters Patent No. 547,629, dated October 8, 1895.

Application filed December 31, 1894. Serial No. 533,413. (No model.)

*To all whom it may concern:*

Be it known that I, OTTO CULLMANN, a citizen of the United States, residing at Chicago, in the county of Cook and State of Illinois, have invented certain new and useful Improvements in Bicycles and other Velocipedes, of which the following is a specification.

The present invention relates in part to that numerous class of bicycles and other velocipedes in which there is a shaft and a power-transmitting device so associated therewith that one operates the other. In all machines of this class as heretofore constructed the shaft cannot be removed without at the same time removing the power-transmitting device.

One of the objects of the present invention is to so improve the construction and arrangement of these parts that the shaft may be removed without disturbing the power-transmitting device, and in accomplishing this object I arrange the power-transmitting device on a part having suitable bearings, and I connect the shaft to this part, so that the two shall move as a single member.

The invention relates in part, also, to that class of velocipedes in which the crank-shaft is formed in two parts united by a coupling-sleeve, which latter carries the power-transmitting device, and the object of this part of the invention is to provide means for so uniting these parts that they may be readily separated or put together, and when once together will be absolutely incapable of movement relative to each other. Heretofore it has been the practice to provide the two parts of the shaft with right and left threads and to provide the coupling-sleeve which carries the power-transmitting device with corresponding threads and pass through said sleeve and the two parts of the shaft a pin for preventing their relative movement; but this construction is objectionable, because it does not enable the ready separation of the parts and because it has no means for tightening the parts when they wear loose, which they will inevitably do. To overcome this objection is another object of the present invention, and in accomplishing this object I provide the two members of the shaft with differential threads pitched in the same direction. I provide the coupling-sleeve with corresponding threads, and I provide a lock-nut for preventing the coupling-sleeve from turning after the parts are properly assembled.

With these objects in view the present invention consists in the features of novelty that are particularly pointed out in the claims hereinafter.

In order that the said invention may be fully understood, I will describe it with reference to the accompanying drawings, which are made a part hereof, and in which—

Figure 2:
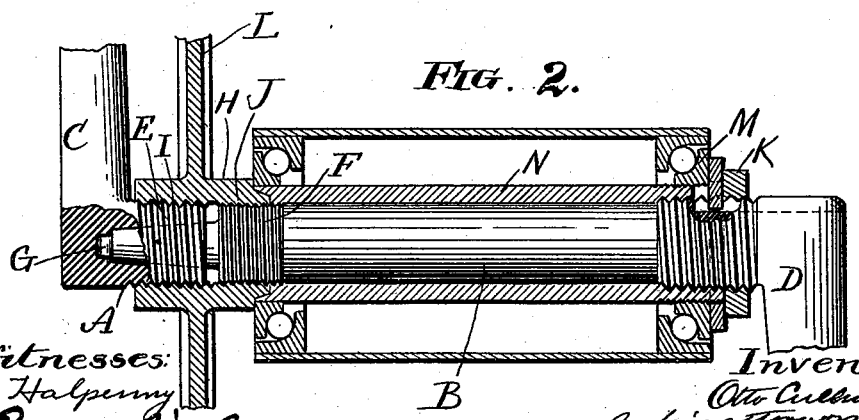

Figures 1 and 2 are sectional elevations of parts of a bicycle or other velocipede embodying the invention under two different modifications.

In Fig. 1, A and B represent the two parts of the shaft to be joined, which in this instance are the two parts of the crank-shaft of a bicycle, the cranks being shown at C and D, each being integral with one part of the shaft. These parts A and B are provided with differential threads at E and F, respectively, that are pitched in the same direction, and the abutting faces of said parts are provided with features G, which, when in engagement, hold the parts positively against relative rotation. H is a third part, called in this specification a "coupling." It consists, preferably, of a tube and is provided on its interior with differential threads I and J, that correspond with the threads E and F, respectively. The parts thus constructed may be joined as follows: Insert the part A in the appropriate end of the coupling and screw it in a short distance—say a sixteenth of an inch—farther than it is desired that it shall be when the joint is complete. Then insert the part B in the other end of the coupling and screw it in until it comes in contact with the part A. Then place the parts A and B in such positions that the features G will engage when the parts are moved toward each other. Then turn the coupling in such direction that it draws the part B into it and forces the part A out of it, continuing until the coupling can be turned no farther. The thread F being faster than the thread E, it follows that the part B will move into the coupling faster than the part A moves out of it, and in this way the features G are made to interlock and the parts are brought to a firm bearing against each other. It will be impossible for the parts A and B to move relatively to the sleeve in the directions that brought them to the positions last described, and hence it follows that if means be provided for preventing their relative movement in the opposite direction the parts cannot work loose. It is to this end that I provide a lock-nut K, which is arranged on a threaded portion of one of the two parts of the shaft and bears against the end of the coupling. By providing the two parts with differential threads arranged as above described it is possible to so secure and lock the coupling-sleeve in place that the power-transmitting device, which in the instance shown in the drawings is the sprocket-wheel customarily used on velocipedes, may be either formed with it or secured to it; but where the parts are provided with right and left threads and the coupling-sleeve is provided with corresponding threads it is not possible to so arrange a lock-nut or lock-nuts as to prevent the coupling-sleeve from turning relatively to the parts joined when force is applied to it in one direction. It is of course true that force applied to it in the other direction will tend to draw the two parts closer together; but in the absence of some means for effectively preventing the coupling from turning in the direction first aforesaid, said means being of such a nature that the parts may be readily separated and assembled, this construction is not practical for use on a bicycle. In Fig. 1 of the drawings I have shown the power-transmitting device L as being secured to the coupling, and I have shown this coupling as continuing entirely through the crank-axle hanger and as having secured to it the cones M, upon which are formed the inner races for the bearing-balls. The advantage of this construction is that the two parts of the crank-shaft may be separated and removed without in the least disturbing either the power-transmitting device or the bearings. I am aware that it is not new to couple a two-part crank-shaft by means of a sleeve having right and left threads and carrying the cones; but I believe myself to be the first to couple the two parts of a shaft by means of a sleeve carrying the cones and also the power-transmitting device.

In the form of the invention shown in Fig. 2 the coupling H is integral with and constitutes the hub of the power-transmitting device L. In Fig. 1 the two parts of the shaft are of substantially equal length, while in Fig. 2 the part B is the longer of the two; but this is not a difference embodying a departure from the spirit and essence of the invention.

The parts shown in Fig. 2 are secured together in precisely the same manner as above described with reference to Fig. 1; but in the arrangement shown in Fig. 2 the coupling is not continued through the crank-axle hanger and consequently will be without any support when the two parts of the shaft are separated. In this form of the invention there is a separate tube N, that passes through the crank-axle hanger and carries the cones. This tube bears against the end of the coupling and is in turn borne against by the lock-nut K through the medium of a washer.

Having thus described my invention, the following is what I claim as new therein and desire to secure by Letters Patent:

1. The combination of two parts having differential threads pitched in the same direction, means holding them against relative rotation, a coupling having differential threads pitched in the same direction and corresponding with the threads of the two parts aforesaid, a nut for locking the coupling, and a power transmitting device carried by the coupling substantially as set forth.

2. The combination with a shaft, of a tube, means uniting them separably but so that while united they turn as a single member, a power transmitting device carried by the tube, and means for sustaining the tube in place when the shaft is separated therefrom, substantially as set forth.

3. The combination with the crank axle hanger of a tube supported thereby and having upon its interior differential threads pitched in the same direction, a power transmitting device carried by said tube, a two-part crank shaft, said parts having differential threads engaging the threads of the tube and having also non-rotative engagement with each other and a nut locking the tube and shaft together substantially as set forth.

4. The combination of a two-part shaft, said parts having non-rotative engagement with each other and having also differential threads pitched in the same direction, a coupling having differential threads corresponding with and engaging the threads of the two-part shaft, a lock-nut engaging the coupling, a power transmitting device carried by the coupling, journal bearings carried by the coupling and means for sustaining the coupling when the two parts of the shaft are separated therefrom substantially as set forth.

OTTO CULLMANN.

Witnesses:
ALEX. LUNDBERG,
L. M. HOPKINS.